United States Patent
Yang et al.

(10) Patent No.: US 9,768,703 B2
(45) Date of Patent: Sep. 19, 2017

(54) SHOOT-THROUGH PREVENTION IN SWITCHED-MODE POWER SUPPLIES

(71) Applicant: Apple Inc., Cupertino, CA (US)

(72) Inventors: Zaohong Yang, Plano, TX (US); Bharatkumar K. Patel, San Jose, CA (US); Bogdan T. Bucheru, San Jose, CA (US); Juan Carlos Pastrana, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/985,040

(22) Filed: Dec. 30, 2015

(65) Prior Publication Data

US 2016/0190948 A1    Jun. 30, 2016

Related U.S. Application Data (60) Provisional application No. 62/134,825, filed on Mar. 18, 2015, provisional application No. 62/098,523, filed on Dec. 31, 2014.

(51) Int. Cl.
| | | |
|---|---|---|
| *H02M 3/315* | (2006.01) | |
| *H02M 3/335* | (2006.01) | |
| *H02M 1/32* | (2007.01) | |
| H02M 1/00 | (2006.01) | |

(52) U.S. Cl.
CPC ......... *H02M 3/33592* (2013.01); *H02M 1/32* (2013.01); *H02M 2001/0032* (2013.01); *H02M 2001/0038* (2013.01); *H02M 2001/0054* (2013.01); *Y02B 70/1475* (2013.01); *Y02B 70/1491* (2013.01); *Y02B 70/16* (2013.01)

(58) Field of Classification Search
CPC ......... H02M 3/33507; H02M 3/33515; H02M 3/33576; H02M 3/33592; H02M 3/315; H02M 1/32; H02M 7/515
USPC ......... 363/21.01, 21.12, 21.13, 21.14, 56.01, 363/56.04, 56.09, 95, 97
See application file for complete search history.

(56) References Cited

U.S. PATENT DOCUMENTS

| | | | |
|---|---|---|---|
| 7,408,796 B2* | 8/2008 | Soldano | H02M 3/33592 363/127 |
| 8,520,414 B2 | 8/2013 | Garrity | |
| 9,374,011 B2* | 6/2016 | Liu | H02M 3/33592 |
| 2013/0063985 A1 | 3/2013 | Ye | |

(Continued)

OTHER PUBLICATIONS

Zhang, Zhiliang, "MOSFET Current Source Gate Drivers and Topologies for High Efficiency and High Frequency Voltage Regulator Modules," Apr. 2009, Queen's University, Kingston, Ontario, Canada.

*Primary Examiner* — Adolf Berhane
(74) *Attorney, Agent, or Firm* — Blank Rome LLP (57) ABSTRACT

The disclosed embodiments provide a system that operates a flyback converter. During activation of a synchronous rectifier (SR) controller on a secondary side of the power converter, the system temporarily disables driving of a gate of a metal-oxide-semiconductor field-effect transistor (MOSFET) by the SR controller to enable synchronization of the SR controller to a switching frequency on a primary side of the power converter. After driving of the gate of the MOSFET by the SR controller has been disabled for a pre-specified period, the system enables driving of the gate of the MOSFET by the SR controller.

28 Claims, 8 Drawing Sheets

(56) References Cited

U.S. PATENT DOCUMENTS

| | | | |
|---|---|---|---|
| 2013/0235620 A1* | 9/2013 | Morris | H02M 3/335 363/21.12 |
| 2014/0112027 A1 | 4/2014 | Tseng | |
| 2014/0268914 A1* | 9/2014 | Wang | H02M 3/33592 363/21.13 |
| 2015/0280576 A1* | 10/2015 | Hinz | H02M 3/33507 363/21.15 |
| 2015/0333641 A1* | 11/2015 | Gong | H02M 3/33592 363/21.14 |
| 2016/0111961 A1* | 4/2016 | Balakrishnan | H02M 3/33507 363/21.12 |
| 2016/0141961 A1* | 5/2016 | Odell | H02M 3/33507 363/21.17 |
| 2016/0276945 A1* | 9/2016 | Yan | H02M 3/33592 |
| 2016/0294298 A1* | 10/2016 | Wong | H02M 3/33592 |

* cited by examiner

SHOOT-THROUGH PREVENTION IN SWITCHED-MODE POWER SUPPLIES

CROSS-REFERENCE TO RELATED APPLICATIONS

This application claims priority to U.S. Provisional Patent Application No. 62/098,523, filed Dec. 31, 2014, and U.S. Provisional Patent Application No. 62/134,825, filed Mar. 18, 2015, the contents of which applications are entirely incorporated by reference herein.

BACKGROUND

Field

The disclosed embodiments relate to power converters for electronic devices. More specifically, the disclosed embodiments relate to techniques for preventing shoot-through in switched-mode power supplies.

Related Art

Flyback converters may be used to convert alternating current (AC) to direct current (DC) in low-power applications such as mobile phone chargers and/or laptop computer power adaptors. For example, an external power supply (e.g., power brick) for a laptop computer may use a flyback converter to convert AC mains power from a power outlet into low-voltage DC that can be used by components in the laptop computer.

During operation of a flyback converter, synchronous rectification (SR) of a secondary metal-oxide-semiconductor field-effect transistor (MOSFET) may be temporarily disabled during light-load conditions to reduce power losses. After the flyback converter exits light-load conditions, active switching of the secondary MOSFET may be enabled by activating an SR controller on the secondary side of the flyback converter. However, the SR controller may activate to an incorrect state by synchronizing with the ringing of the drain to source voltage of the secondary MOSFET instead of a gate-drive signal on the primary side. Such mis-synchronization may increase the amplitude of the ringing and cause the drain-to-source voltage of the secondary MOSFET to drop below a threshold in synchronous rectifier driver for turning on the secondary MOSFET. If the secondary MOSFET is then turned on while the primary MOSFET of the flyback converter is also conducting, a shoot-through of both the primary and secondary FETs may occur in the flyback converter. During the shoot-through, current in the secondary FET may reverse direction and cause the reflected secondary-side current to flow into the primary FET. The sum of the original primary-side current and the reflected secondary-side current may saturate the transformer in the flyback converter and subject the primary FET to both high current and high voltage, which can damage the flyback converter.

Consequently, operation of flyback converters may be facilitated by mechanisms for preventing mis-synchronization-related shoot-through in the flyback converters.

SUMMARY

The disclosed embodiments provide a system that operates a flyback converter. During activation of a synchronous rectifier (SR) controller on a secondary side of the power converter, the system temporarily enables and disables driving of a gate of a metal-oxide-semiconductor field-effect transistor (MOSFET) on the secondary side by the SR controller to allow synchronization of the SR controller to a switching frequency on a primary side of the power converter. After driving of the gate of the MOSFET by the SR controller has been disabled for a pre-specified period, the system enables driving of the gate of the MOSFET by the SR controller.

In some embodiments, upon detecting an output voltage of the power converter that falls below a voltage threshold, the system deactivates the SR controller. Upon detecting a subsequent increase of the output voltage to above the voltage threshold, the system activates the SR controller.

In some embodiments, the voltage threshold is associated with a boundary between a discontinuous-conduction mode (DCM) and a continuous-conduction mode (CCM) in the power converter.

In some embodiments, upon detecting an aggregate current (e.g., average current over a pre-specified period) on the secondary side that falls below a current threshold, the system deactivates the SR controller. Upon detecting a subsequent increase of the aggregate current to above the current threshold, the system activates the SR controller.

In some embodiments, the current threshold is associated with light-load conditions in the power converter.

In some embodiments, the pre-specified period includes a number of cycles of the gate-drive pulses on the primary side of the power converter.

In some embodiments, driving of the gate of the MOSFET by the SR controller is disabled for the pre-specified period using a resistance/capacitance (RC) delay.

In some embodiments, the power converter includes a flyback converter.

In some embodiments, disabling driving of the gate of the MOSFET by the SR controller includes blanking a gate-drive signal of the SR controller during the pre-specified period.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
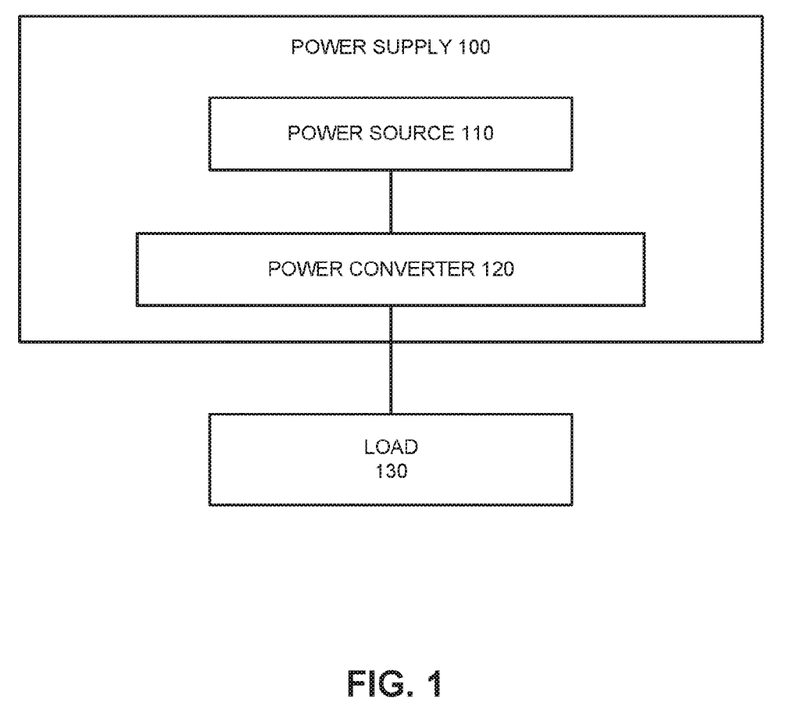
FIG. 1 shows a power supply for an electronic device in accordance with the disclosed embodiments.

The disclosed embodiments provide a power supply for an electronic device. As shown in FIG. 1, the power supply 100 includes a power source 110 and a power converter 120. Power converter 120 may obtain an input voltage from power source 110 and convert the input voltage into an output voltage that is used to drive a load 130. For example, power converter 120 may convert alternating current (AC) mains power into low-voltage direct current (DC) that is used to charge a battery and/or power components of a portable electronic device such as a mobile phone, laptop computer, portable media player, and/or tablet computer.

Furthermore, power supply 100 may be designed to accommodate size constraints associated with load 130. For example, the small form factor of a portable electronic device corresponding to load 130 may require the design of a similarly small power supply 100 for use with the portable electronic device. Moreover, gradual reductions in the size and/or weight of the portable electronic device over time may be accompanied by corresponding reductions in the size and/or weight of power supply 100 to further improve the portability of the portable electronic device.

Conversely, such size constraints may result in power losses that reduce the efficiency of power supply 100. In particular, power conversion in power supply 100 may involve a tradeoff between size and efficiency, in which larger electronic components (e.g., transformers, inductors, etc.) may generate a given output voltage at a lower switching frequency, and thus dissipate less power, than smaller electronic components. Because a small form factor for power supply 100 may require the use of small electronic components within power converter 120, power supply 100 may be associated with higher switching losses than a power supply with larger electronic components.

To mitigate switching losses in power supply 100, the switching frequency of power converter 120 may be varied in response to changes in load (e.g., from the portable electronic device) and/or input voltage (e.g., from power source 110). For example, the charging of a battery in the portable electronic device and/or the powering on or off of a component (e.g., processor, touchscreen, speakers, etc.) in the portable electronic device may cause the switching frequency of power converter 120 to sweep across a range of frequencies, such as frequencies ranging between 80 KHz and 400 KHz.

Figure 2:
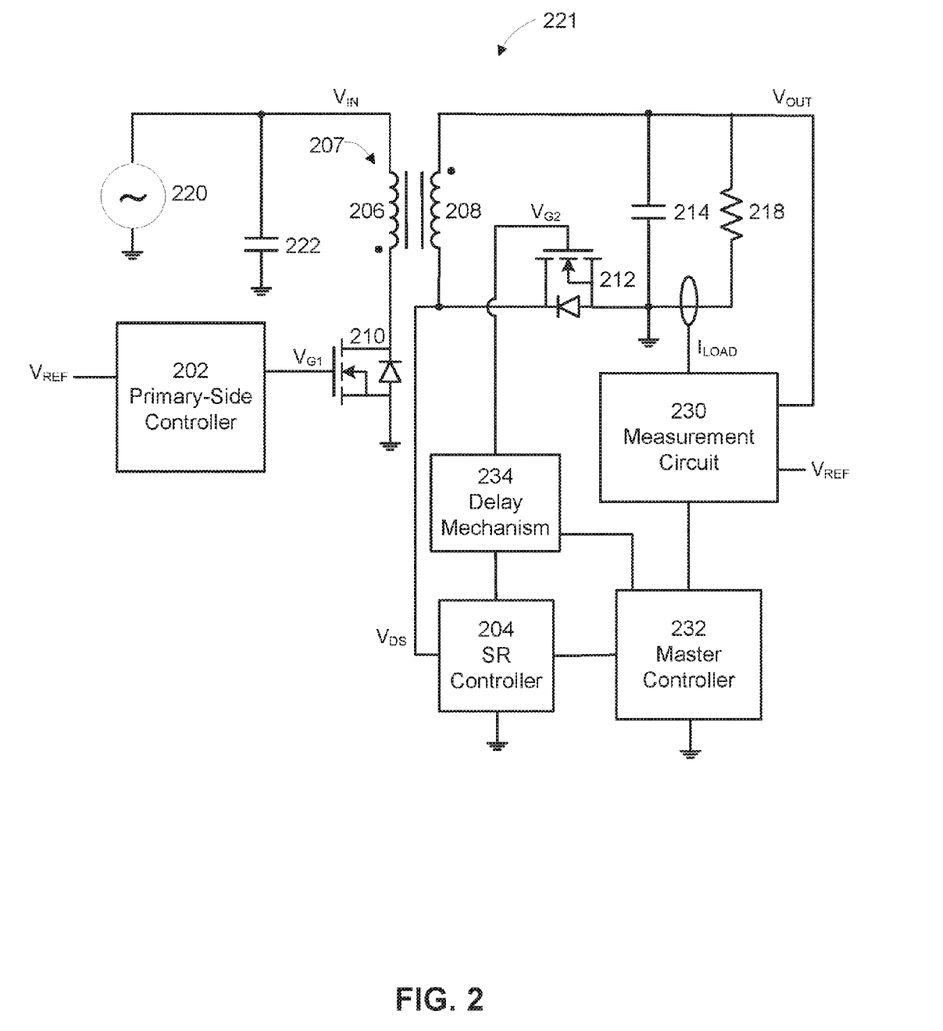
FIG. 2 shows a system for operating a flyback converter in accordance with the disclosed embodiments.

The efficiency of power converter 120 may additionally be improved by performing synchronous rectification (SR), in which one or more diodes in power converter 120 are replaced with actively controlled switches such as power metal-oxide-semiconductor field-effect transistors (MOSFETs). As shown in FIG. 2, a power converter (e.g., power converter 120 of FIG. 1) may be implemented as a flyback converter 221. A primary input voltage (e.g., "$V_{IN}$") may be supplied to the flyback converter 221 from a power source 220 and/or a bulk capacitor 222 coupled to power source 220. For example, the input voltage may be obtained as AC mains power from a power outlet and/or a voltage from bulk capacitor 222, which is charged using the AC mains power. The input voltage may be converted into an output voltage (e.g., "$V_{OUT}$") by the flyback converter 221, which contains a primary winding 206, a secondary winding 208, a primary switch 210, and a secondary switch 212. Primary winding 206 and secondary winding 208 may form a transformer 207, and switches 210-212 may be metal-oxide-semiconductor field-effect transistors (MOSFETs).

During operation of the flyback converter, a primary-side controller 202 may charge the transformer 207 by closing switch 210. For example, in instances where primary switch 210 is a MOSFET, control circuit 202 may toggle the MOSFET from an off-state to an on-state to couple primary winding 206 to power source 220. The varying current in primary winding 206 may create a varying magnetic flux in the transformer 207, resulting in a varying voltage in secondary winding 208. At the same time, secondary switch 212 may be opened by an SR controller 204 to decouple secondary winding 208 from a resistive load 218 (e.g., a system load powered by the flyback converter) connected to the flyback converter 221.

Primary-side controller 202 may then discharge the transformer 207 by opening switch 210. For example, control circuit 202 may toggle the MOSFET providing primary switch 210 from the on-state to the off-state to discharge the flyback converter 221. SR controller 204 may close secondary switch 212 in response to the opening of primary switch 210, thus allowing current to flow from secondary winding 208. Some of the current may then be collected by a capacitor 214, which supplies the current to load 218 and acts as a low-pass filter by reducing voltage ripple caused by fluctuating current through secondary winding 208.

To repeatedly charge and discharge the flyback transformer 207, primary-side controller 202 may generate a gate signal (e.g., "$V_{G1}$") that continuously opens and closes primary switch 210 (e.g., by toggling a MOSFET providing primary switch 210 between an on-state and an off-state). Primary-side controller 202 may further adjust the frequency and/or duty cycle of the gate signal to control the voltage and/or current supplied to load 218.

While primary-side controller 202 toggles primary switch 210, SR controller 204 may operate secondary switch 212 in a complementary fashion to that of primary switch 210. For example, SR controller 204 may enable a MOSFET providing secondary switch 212 upon detecting a negative drain to source voltage in the MOSFET (e.g., indicating conduction of a body diode in the MOSFET). Alternatively, SR controller 204 may enable the MOSFET (212) when a measurement circuit 230 detects current conducting in the forward direction on the secondary side of the flyback converter 221. The enabled MOSFET may reduce the voltage drop and power loss of secondary switch 212, thus increasing the efficiency of the flyback converter. SR controller 204 may then disable the MOSFET (212) once the drain-to-source voltage of the MOSFET (212) becomes positive (e.g., indicating the end of conduction in the body diode).

To improve the noise immunity of the flyback converter 221, SR controller 204 may have a minimum on-time and/or off-time. For example, SR controller 204 may have a minimum off-time so that drain voltage ringing during discontinuous-conduction-mode (DCM) operation of the flyback converter 221 does not trigger an incorrect turn-on of secondary switch 212. Similarly, SR controller 204 may have a minimum on-time to prevent ringing at the initiation of the on-time from triggering an incorrect turn-off of secondary switch 212.

SR controller 204 may further be deactivated by a master controller 232 during light-load conditions and/or a short circuit fault on the secondary side of the flyback converter 221. First, master controller 232 may obtain a measurement of aggregate current on the secondary side from measurement circuit 230 and identify a light load (e.g., load 218 at $I_{LOAD}$) or no load if the aggregate current (e.g., average current over a pre-specified period) falls below a current threshold. In turn, master controller 232 may deactivate SR controller 204 to prevent energy from circulating between the primary and secondary sides, which increases conduction losses during light-load or no-load conditions.

Second, master controller 232 may obtain measurements of output voltage from measurement circuit 230 and detect a short-circuit condition if the output voltage falls below a voltage threshold. The voltage threshold may represent a boundary between DCM and continuous-conduction mode (CCM) in the flyback converter 221. In short-circuit conditions, the flyback converter 221 may be in CCM, the output voltage may drop, and energy rise in the transformer during the on-time of primary switch 210 may exceed the energy decay during the off-time of primary switch 210. As a result, the primary current may increase until magnetic saturation is reached in the transformer and damage or failure occurs in the flyback converter 221. To mitigate the damage or failure, master controller 232 may deactivate SR controller 204 so that the short-circuit condition is handled by the body diode of secondary switch 212.

After SR controller 204 is deactivated, master controller 232 may subsequently activate SR controller 204 once the output voltage is above the voltage threshold and the aggregate current is above the current threshold. However, SR controller 204 may be susceptible to mis-synchronization with gate-drive pulses on the primary side of the flyback converter 221 during activation. As discussed further below with respect to FIG. 3, such mis-synchronization may cause SR controller 204 to incorrectly enable secondary switch 212 during ringing in the drain to source voltage of secondary switch 212 instead of discharging of the flyback converter 221. A shoot-through in the flyback converter 221 may occur if secondary switch 212 is enabled at the same time as primary switch 210, causing current in secondary switch 212 to reverse direction and the reflected secondary-side current to flow into primary switch 210. The sum of the original primary-side current and the reflected secondary-side current may saturate the transformer and subject primary switch 210 to both high current and high voltage, which can damage the flyback converter 221.

In one or more embodiments, the system of FIG. 2 includes functionality to prevent shoot-through caused by mis-synchronization of an activating SR controller 204 with the primary side of the flyback converter. As described in further detail below, a delay mechanism 234 may temporarily disable driving of a the gate of a MOSFET providing secondary switch 212 by SR controller 204 during activation of SR controller 204. While driving of the gate by SR controller 204 is disabled, SR controller 204 may sense the drain to source voltage of the MOSFET and synchronize to the switching frequency on the primary side of the flyback converter 221. After driving of the gate by SR controller 204 has been disabled for a pre-specified period, driving of the gate by SR controller 204 may be safely enabled to improve the efficiency of the flyback converter 221.

Those skilled in the art will appreciate that the system of FIG. 2 may be implemented in a variety of ways. For example, components in SR controller 204, master controller 232, measurement circuit 230, and/or delay mechanism 234 may be provided by a single application-specific integrated circuit (ASIC). Alternatively, SR controller 204, master controller 232, measurement circuit 230, and/or delay mechanism 234 may utilize other combinations of integrated and discrete components. Moreover, SR controller 204, master controller 232, measurement circuit 230, and/or delay mechanism 234 maybe implemented as analog and/or digital circuits based on design requirements associated with the size, operating frequency, operating temperature, and/or efficiency of the power converter. Finally, secondary switch 212 may reside on a top side of the circuit (e.g., between the top of secondary winding 208 and the positive terminal of capacitor 214) instead of the bottom side of the circuit, as shown in FIG. 2.

Figure 3:
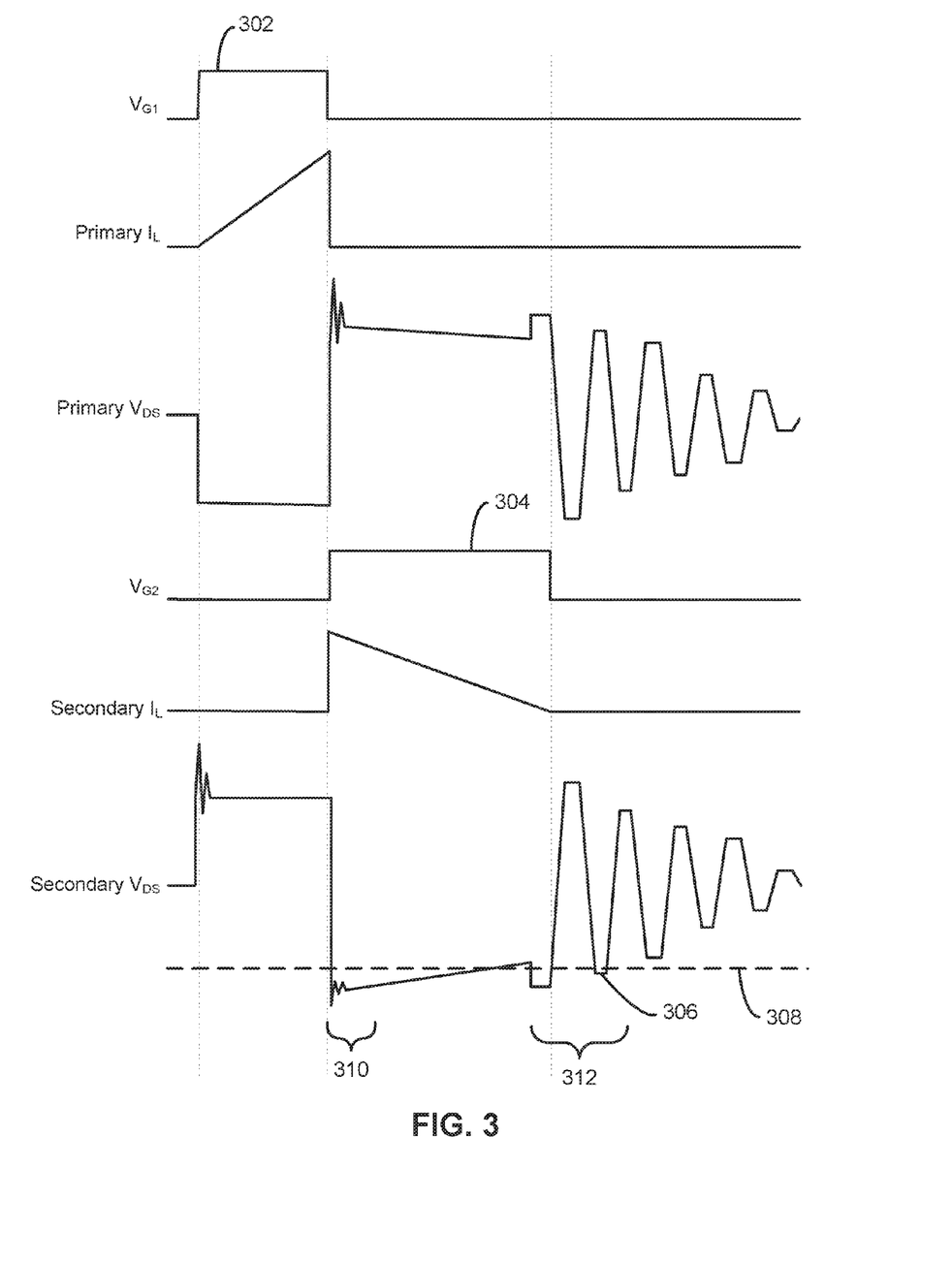
FIG. 3 shows an exemplary set of voltages and currents in accordance with the disclosed embodiments.

FIG. 3 shows an exemplary set of voltages and currents in accordance with the disclosed embodiments. As shown in FIG. 3, a gate-drive pulse 302 (e.g., "$V_{G1}$") is generated to enable a primary MOSFET (e.g., primary switch 210 of FIG. 2) in a power converter such as a flyback converter 221. While the primary MOSFET is enabled, the primary current (e.g., "Primary $I_L$") in the primary winding (e.g., primary winding 206 of FIG. 2) of the flyback converter (221) ramps up, and the drain to source voltage of the primary MOSFET (e.g., "Primary $V_{DS}$") drops to close to 0V. At the same time, a secondary MOSFET (e.g., secondary switch 212 of FIG. 2) is disabled, and the drain to source voltage of the primary MOSFET (e.g., "Primary $V_{DS}$") increases from a near zero voltage (0V) to a positive voltage.

At the end of gate-drive pulse 302, the primary MOSFET is disabled, the drain to source voltage of the primary MOSFET increases to a positive value, and a gate-drive pulse 304 (e.g., "$V_{G2}$") is generated to enable the secondary MOSFET. Gate-drive pulse 304 may be generated in response to a negative drain to source voltage (e.g., "Secondary $V_{DS}$") of the secondary MOSFET. In turn, primary current ceases to flow in the primary winding, while secondary current (e.g., "Secondary $I_L$") in a secondary winding (e.g., secondary winding 208 of FIG. 2) of the flyback converter ramps down. After the end of gate-drive pulse 304, both primary and secondary currents may be zero, and the primary and secondary drain to source voltages may experience some ringing.

In particular, a ring 306 may cause the drain to source voltage of the secondary MOSFET to drop below a turn-on threshold 308 for the secondary MOSFET. To prevent an SR controller (e.g., SR controller 204 of FIG. 2) from incorrectly enabling the secondary MOSFET as a result of ring 306, a minimum off-time 312 may be enforced in the SR controller. Similarly, a minimum on-time 310 may prevent the SR controller from incorrectly disabling the secondary MOSFET as a result of ringing that occurs at the beginning of gate-drive pulse 304.

Those skilled in the art will appreciate that minimum on-time 310 and minimum off-time 312 may not be enforced during activation of the SR controller. As mentioned above, the SR controller may be deactivated during light-load conditions and/or a short circuit on the secondary side of the flyback converter. The SR controller may then be reactivated after light-load and/or short-circuit conditions are no longer detected in the flyback converter. While the SR controller reactivates, the SR controller may synchronize with gate-drive pulses on the primary side by sensing and/or obtaining measurements of the drain to source voltage of the secondary MOSFET, the output voltage, and/or the secondary current.

However, the SR controller may potentially mis-synchronize with ringing after gate-drive pulse 304 instead of with gate-drive pulses on the primary side of the flyback converter. For example, the SR controller may enable the secondary MOSFET in response to ring 306 instead of gate-drive pulse 302. The enabled secondary MOSFET may increase the amplitude of the ringing, and the SR controller may continue to incorrectly generate gate-drive pulses in response to the increased ringing. If one of the gate-drive pulses overlaps with a gate-drive pulse on the primary MOSFET, a shoot-through may occur and damage the flyback converter.

To prevent mis-synchronization of the SR controller with ringing after gate-drive pulse 304, driving of the gate of the secondary MOSFET by the SR controller may be temporarily disabled during activation of the SR controller to allow the SR controller to synchronize with the switching frequency on the primary side of the flyback converter. For example, a delay mechanism (e.g., delay mechanism 234 of FIG. 2) may produce an RC delay that blanks gate-drive pulses from the SR controller for a number of cycles of gate-drive pulses on the primary side. While the gate-drive pulses are blanked, the SR controller may correctly synchronize with the gate-drive pulses on the primary side instead of ringing that occurs after the flyback converter has discharged. After the delay introduced by the delay mechanism has passed, driving of the gate of the secondary MOSFET by the SR controller may be enabled.

Figure 4:
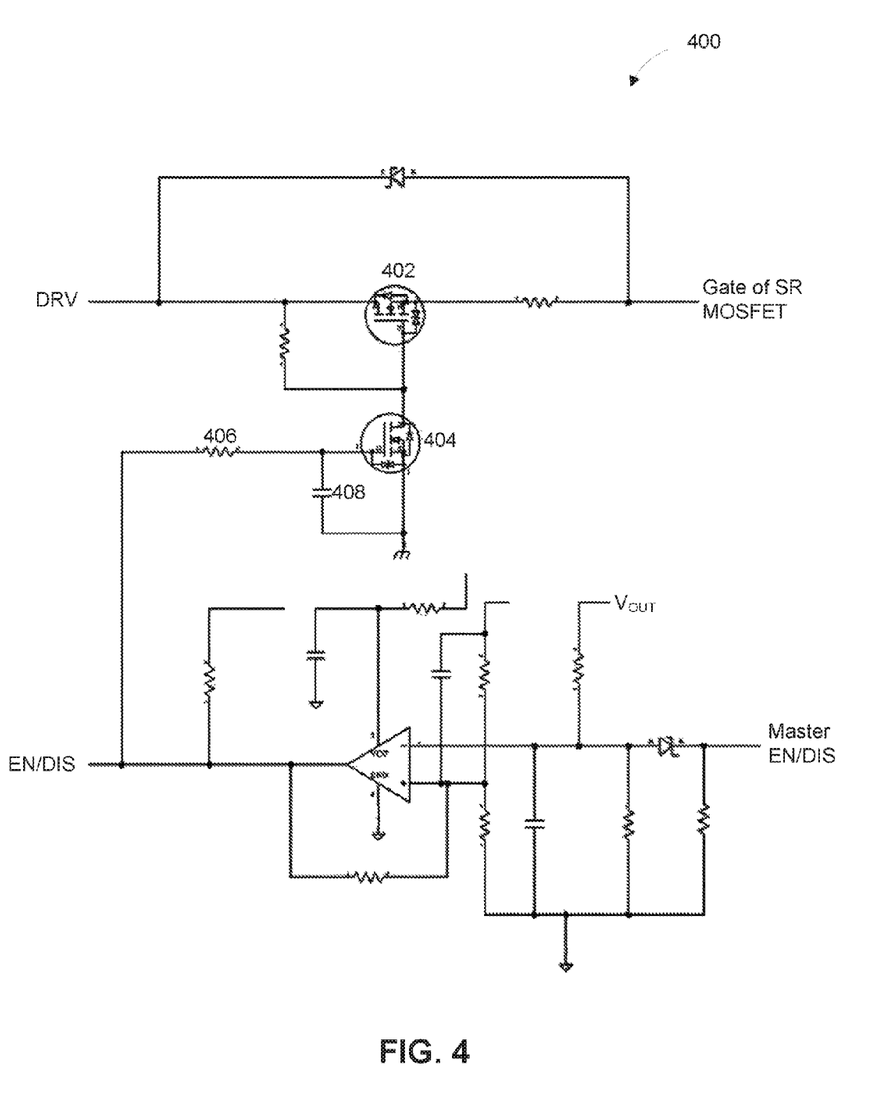
FIG. 4 shows an exemplary delay mechanism in accordance with the disclosed embodiments.

FIG. 4 shows an exemplary delay mechanism 400 (e.g., delay mechanism 234 of FIG. 2) in accordance with the disclosed embodiments. The delay mechanism may be coupled to a master controller (e.g., master controller 232 of FIG. 2) via a "Master EN/DIS" pin and to an SR controller (e.g., SR controller 204 of FIG. 2) via a "DRV" pin and an "EN/DIS" pin. The delay mechanism may also be coupled to the gate of a secondary MOSFET of a flyback converter via a "$V_{G2}$" pin (See FIG. 2). The delay mechanism can include two switches 402-404, a resistor 406, and a capacitor 408, as well as other components as illustrated.

When the master controller (232) activates the SR controller (204) through the "Master EN/DIS" pin, the "EN/DIS" pin of SR controller 204 pulls down to enable driving of the gate of a secondary MOSFET by the SR controller, and the output of the SR controller produces gate-drive pulses via the "DRV" pin 412. The circuit formed by switches 402-404, resistor 406, and capacitor 408 produces a programmed time delay, which prevents the signal from the "DRV" pin from reaching the gate of the secondary MOSFET (e.g., secondary switch 212 of FIG. 2) via the "$V_{G2}$/Gate of SR MOSFET" pin until a pre-specified period has passed. As a result, the SR controller may correctly synchronize with the switching frequency of the primary side of the flyback converter before driving the gate of the secondary MOSFET, and shoot-through in the flyback converter may be averted.

Figure 5:
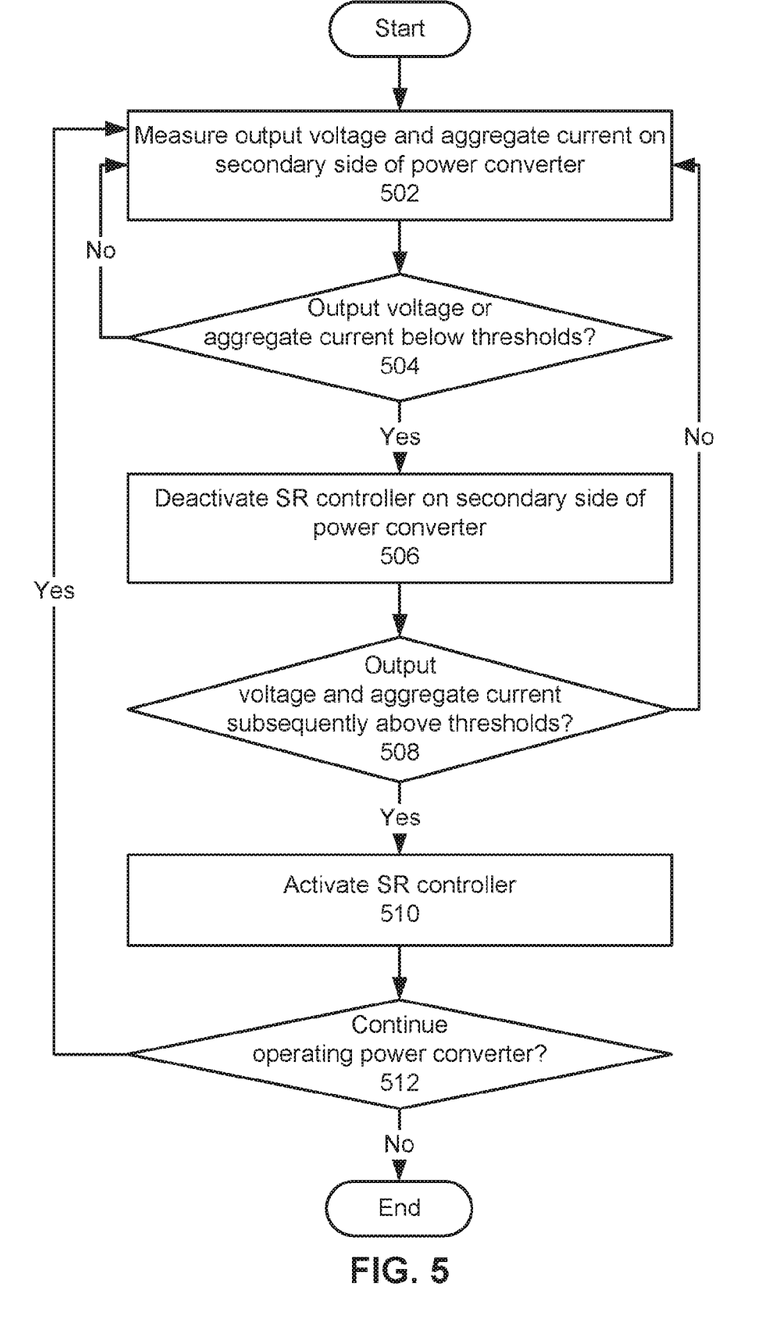
FIG. 5 shows a flowchart illustrating the process of operating a power converter in accordance with the disclosed embodiments.

FIG. 5 shows a flowchart illustrating the process of operating a power converter in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, the output voltage and aggregate current are measured on the secondary side of the power converter (operation 502) to determine if the output voltage and aggregate current are below voltage or current thresholds (operation 504) for the power converter. The voltage threshold may be associated with a boundary between DCM and CCM in the power converter. The current threshold may be associated with light-load conditions in the power converter.

If either threshold is not met, an SR controller on the secondary side of the power converter is deactivated (operation 506). For example, the SR controller may be deactivated if the voltage threshold is not met to prevent shoot-through during short-circuit conditions on the secondary side. The SR controller may also be deactivated if the current threshold is not met to reduce power losses during light-load conditions in the power converter. If both thresholds are met by the output voltage and aggregate current, the SR controller may continue operating (e.g., driving a gate of a secondary MOSFET), and the output voltage and/or aggregate current may continue to be compared to the thresholds (operation 508). While one or both thresholds are not met, the output voltage and aggregate current may continue to be measured (operation 502) and compared to the thresholds (operation 504), and the SR controller may continue to be deactivated (operation 506).

After both thresholds are met, the SR controller is activated (operation 510). As described in further detail below with respect to FIG. 6, driving of the gate of the secondary MOSFET by the SR controller may temporarily be disabled to prevent shoot-through associated with mis-synchronization of the SR controller with the primary side during activation of the SR controller.

The power converter may continue to be operated (operation 512). For example, the power converter may be operated while the power converter is connected to an input voltage and a load is driven by the power converter. During operation of the power converter, the SR controller may be deactivated and activated based on the output voltage and aggregate current on the secondary side (operations 502-510). Such activation and deactivation of the SR controller may continue until the power converter is no longer used to drive the load.

Figure 6:
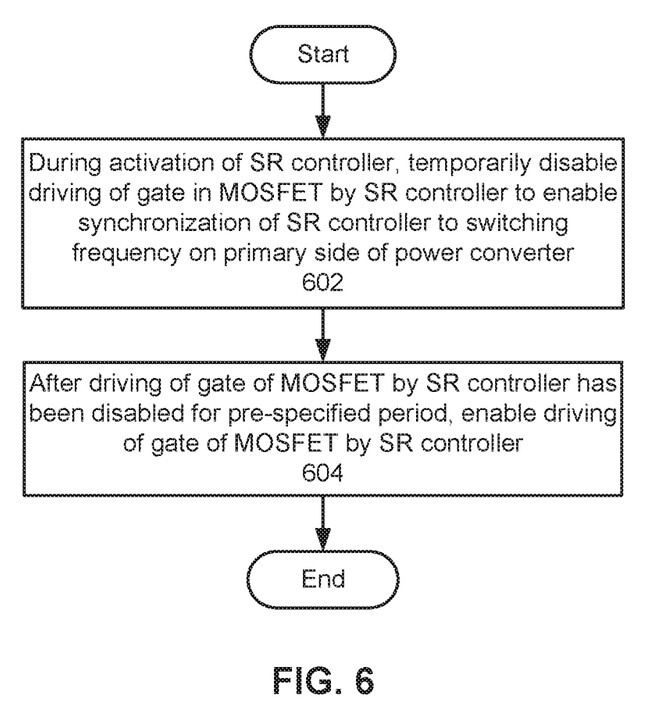
FIG. 6 shows a flowchart illustrating the process of facilitating operation of a power converter in accordance with the disclosed embodiments.

FIG. 6 shows a flowchart illustrating the process of facilitating operation of a power converter in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, during activation of an SR controller in the power converter, driving of a gate in a MOSFET by the SR controller is temporarily disabled to enable synchronization of the SR controller to a switching frequency on the primary side of the power converter (operation 602). For example, an RC delay may be used to blank gate-drive pulses from the SR controller for a pre-specified number of cycles of gate-drive pulses on the primary side of the power converter. While the gate-drive pulses are blanked, the SR controller may synchronize to a 50-300 KHz switching frequency on the primary side instead of MHz-frequency ringing in the power converter.

Next, after driving of the gate of the MOSFET by the SR controller has been disabled for a pre-specified period, driving of the gate of the MOSFET is enabled by the SR controller (operation 604). Because the SR controller has correctly synchronized with the gate-drive pulses on the primary side, the SR controller may drive the gate of the MOSFET in a way that prevents shoot-through in the power converter.

Figure 7:
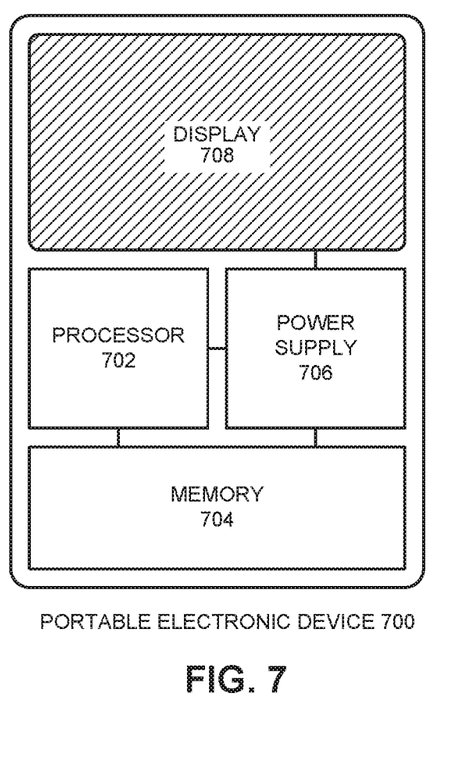
FIG. 7 shows a portable electronic device in accordance with the disclosed embodiments.
Figure 8:
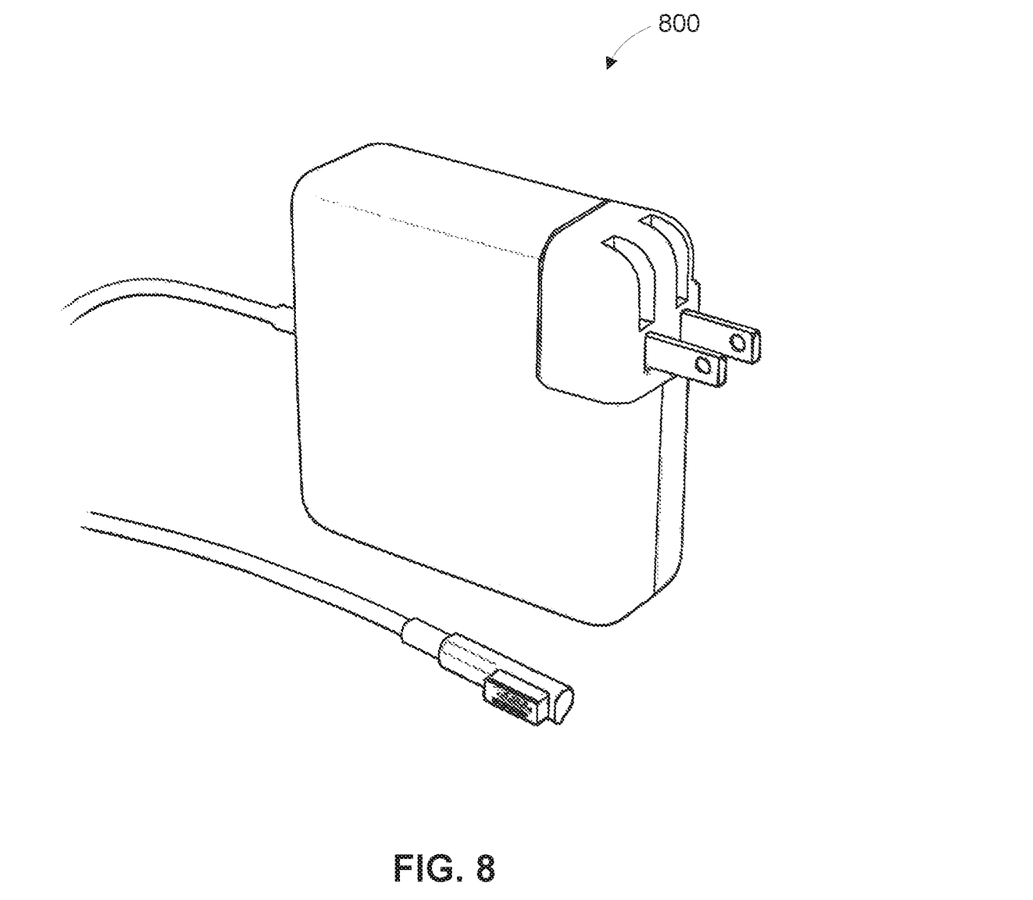
FIG. 8 shows a power adapter in accordance with the disclosed embodiments.

The above-described power delivery system can generally be used in any type of electronic device. For example, FIG. 7 illustrates a portable electronic device 700 which includes a processor 702, a memory 704 and a display 708, which are all powered by a power supply 706. Portable electronic device 700 may correspond to a laptop computer, tablet computer, mobile phone, PDA, portable media player, digital camera, and/or other type of battery-powered electronic device. Power supply 706 may include a power converter that contains a primary side and a secondary side. For example, the power converter may be a flyback converter and/or another type of switched-mode power converter that includes an SR MOSFET on the secondary side. Another example of a power converter may be an individual AC/DC adapter shown in FIG. 8, which can power any portable device, such as laptop, smart phone, table, TV, desktop computer and etc. An SR controller on the secondary side may temporarily be disabled during activation of the SR controller to enable synchronization of the SR controller to the switching frequency on the primary side of the power converter. After driving of the gate of the MOSFET by the SR controller has been disabled for a pre-specified period, driving of the gate of the MOSFET by the SR controller may be enabled.

The foregoing descriptions of various embodiments have been presented only for purposes of illustration and description. They are not intended to be exhaustive nor to limit the present invention to the forms disclosed. Various modifications and changes can be made to the principles and embodiments described herein without departing from the scope of the disclosure and without departing from the scope of the following claims.

What is claimed is:

1. A method for operating a power converter, comprising: during activation of a synchronous rectifier controller on a secondary side of the power converter, using a delay mechanism to temporarily disable driving of a gate of a metal-oxide-semiconductor field-effect transistor (MOSFET) by the synchronous rectifier controller to enable synchronization of the synchronous rectifier controller to a switching frequency on a primary side of the power converter rather than a ringing frequency; and after driving of the gate of the MOSFET by the synchronous rectifier controller has been disabled for a pre-specified period, using the delay mechanism to enable driving of the gate of the MOSFET by the synchronous rectifier controller.

2. The method of claim 1, further comprising:
upon detecting an output voltage of the power converter that falls below a voltage threshold, deactivating the synchronous rectifier controller; and
upon detecting a subsequent increase of the output voltage to above the voltage threshold, activating the synchronous rectifier controller.

3. The method of claim 2, wherein the voltage threshold is associated with a boundary between a discontinuous-conduction mode (DCM) and a continuous-conduction mode (CCM) in the power converter.

4. The method of claim 1, further comprising:
upon detecting an aggregate current on the secondary side that falls below a current threshold, deactivating the synchronous rectifier controller; and
upon detecting a subsequent increase of the aggregate current to above the current threshold, activating the synchronous rectifier controller.

5. The method of claim 4, wherein the current threshold is associated with light-load conditions in the power converter.

6. The method of claim 1, wherein the pre-specified period comprises a number of cycles of gate-drive pulses on the primary side of the power converter.

7. The method of claim 1, wherein driving of the gate of the MOSFET by the synchronous rectifier controller is disabled for the pre-specified period using an RC delay.

8. The method of claim 1, wherein the power converter comprises a flyback converter.

9. A method for operating a power converter, comprising: upon detecting an output voltage of the power converter that falls below a voltage threshold, deactivating a synchronous rectifier controller on a secondary side of the power converter; during a subsequent activation of the synchronous rectifier controller, using a delay mechanism to temporarily disable driving of a gate of a metal-oxide-semiconductor field-effect transistor (MOSFET) by the synchronous rectifier controller to enable synchronization of the synchronous rectifier controller to a switching frequency on a primary side of the power converter rather than a ringing frequency: and after driving of the gate of the MOSFET by the synchronous rectifier controller has been disabled for a pre-specified period, using the delay mechanism to enable driving of the gate of the MOSFET by the synchronous rectifier controller.

10. The method of claim 9, further comprising:
upon detecting an aggregate current on the secondary side that falls below a current threshold, deactivating the synchronous rectifier controller.

11. The method of claim 10, further comprising:
upon detecting a subsequent increase of the aggregate current to above the current threshold, activating the synchronous rectifier controller.

12. The method of claim 10, wherein the current threshold is associated with light-load conditions in the power converter.

13. The method of claim 9, further comprising:
upon detecting a subsequent increase of the output voltage to above the voltage threshold, activating the synchronous rectifier controller.

14. The method of claim 9, wherein the pre-specified period comprises a number of cycles associated with the switching frequency of the primary side of the power converter.

15. The method of claim 9, wherein the voltage threshold is associated with a boundary between a discontinuous-conduction mode (DCM) and a continuous-conduction mode (CCM) in the power converter.

16. A system for operating a power converter, comprising:
a control circuit configured to activate and deactivate a synchronous rectifier controller on a secondary side of the power converter; and
a delay mechanism, wherein during activation of the synchronous rectifier controller by the control circuit, the delay mechanism is configured to:

temporarily disable driving of a gate of a metal-oxide-semiconductor field-effect transistor (MOSFET) by the synchronous rectifier controller to enable synchronization of the synchronous rectifier controller to a switching frequency on a primary side of the power converter rather than a ringing frequency; and after driving of the gate of the MOSFET by the synchronous rectifier controller has been disabled for a pre-specified period, enable driving of the gate of the MOSFET by the synchronous rectifier controller.

17. The system of claim 16, further comprising:
a measurement circuit configured to measure an output voltage of the power converter,
wherein activating and deactivating the synchronous rectifier controller comprises:
  deactivating the synchronous rectifier controller when the measured output voltage falls below a voltage threshold; and
  activating the synchronous rectifier controller when the measured output voltage subsequently increases to above the voltage threshold.

18. The system of claim 17, wherein the measurement circuit is further configured to:
measure an aggregate current on the secondary side of the power converter,
wherein activating and deactivating the synchronous rectifier controller comprises:
  deactivating the synchronous rectifier controller when the measured aggregate current falls below a current threshold; and
  activating the synchronous rectifier controller when the measured aggregate current subsequently increases to above the current threshold.

19. The system of claim 18, wherein the current threshold is associated with light-load conditions in the power converter.

20. The system of claim 17, wherein the voltage threshold is associated with a boundary between a discontinuous-conduction mode (DCM) and a continuous-conduction mode (CCM) in the power converter.

21. The system of claim 16, wherein the pre-specified period comprises a number of cycles associated with the switching frequency of the primary side of the power converter.

22. A non-transitory computer-readable storage medium storing instructions that when executed by a controller cause the controller to perform a method for operating a power converter, the method comprising: during activation of a synchronous rectifier controller on a secondary side of the power converter, using a delay mechanism to temporarily disable driving of a gate of a metal-oxide-semiconductor field-effect transistor (MOSFET) by the synchronous rectifier controller to enable synchronization of the synchronous rectifier controller to a switching frequency on a primary side of the power converter; and after driving of the gate of the MOSFET by the synchronous rectifier controller has been disabled for a pre-specified period, using the delay mechanism to enable driving of the gate of the MOSFET by the synchronous rectifier controller.

23. The non-transitory computer-readable storage medium of claim 22, the method further comprising:
  upon detecting an aggregate current on the secondary side that falls below a current threshold, deactivating the synchronous rectifier controller; and
  upon detecting a subsequent increase of the aggregate current to above the current threshold, activating the synchronous rectifier controller.

24. The non-transitory computer-readable storage medium of claim 23, wherein the current threshold is associated with light-load conditions in the power converter.

25. The non-transitory computer-readable storage medium of claim 22, the method further comprising:
  upon detecting an output voltage of the power converter that falls below a voltage threshold, deactivating the synchronous rectifier controller; and
  upon detecting a subsequent increase of the output voltage to above the voltage threshold, activating the synchronous rectifier controller.

26. The non-transitory computer-readable storage medium of claim 25, wherein the voltage threshold is associated with a boundary between a discontinuous-conduction mode (DCM) and a continuous-conduction mode (CCM) in the power converter.

27. The non-transitory computer-readable storage medium of claim 22, wherein the pre-specified period comprises a number of cycles of the gate-drive pulses on the primary side of the power converter.

28. The non-transitory computer-readable storage medium of claim 22, wherein disabling driving of the gate of the MOSFET by the synchronous rectifier controller comprises:
  blanking a gate-drive signal of the synchronous rectifier controller during the pre-specified period.

* * * * *